United States Patent
Byrne et al.

(10) Patent No.: US 10,008,816 B2
(45) Date of Patent: Jun. 26, 2018

(54) WORK SURFACE POWER UNIT WITH WIRELESS SPEAKERPHONE

(71) Applicants: Norman R. Byrne, Ada, MI (US); Aaron G. Lautenbach, Rockford, MI (US)

(72) Inventors: Norman R. Byrne, Ada, MI (US); Aaron G. Lautenbach, Rockford, MI (US)

( * ) Notice: Subject to any disclaimer, the term of this patent is extended or adjusted under 35 U.S.C. 154(b) by 0 days. days.

(21) Appl. No.: 15/583,372

(22) Filed: May 1, 2017

(65) Prior Publication Data

US 2017/0318609 A1    Nov. 2, 2017

Related U.S. Application Data

(60) Provisional application No. 62/330,766, filed on May 2, 2016.

(51) Int. Cl.
*H04B 1/38* (2015.01)
*H04M 1/62* (2006.01)
(Continued)

(52) U.S. Cl.
CPC ............... *H01R 27/02* (2013.01); *H02J 1/00* (2013.01); *H02J 3/00* (2013.01); *H04M 1/03* (2013.01);
(Continued)

(58) Field of Classification Search
CPC ..... H04W 4/008; H04W 4/005; H04W 84/18; H04W 88/02; H04W 88/04; H04B 1/38;
(Continued)

(56) References Cited

U.S. PATENT DOCUMENTS 8,480,429 B2   7/2013  Byrne
9,300,347 B1   3/2016  Coverstone
(Continued)

OTHER PUBLICATIONS

Commonly owned co-pending application as filed, U.S. Appl. No. 15/499,301, filed Apr. 27, 2017.
(Continued)

*Primary Examiner* — Philip Sobutka
(74) *Attorney, Agent, or Firm* — Gardner, Linn, Burkhart & Ondersma LLP

(57) ABSTRACT

An electrical power unit with wireless communications capability includes a wireless communications module supported in a housing that is configured to be mounted at or along a work surface. The wireless communications module includes an audio speaker, a microphone, a wireless audio signal receiver, and a wireless audio signal transmitter. The wireless signal receiver is operable to receive first electronic audio signals from a first mobile communication device, and the audio speaker is operable to emit amplified sound in response to the wireless signal receiver receiving the first electronic audio signals. The wireless audio signal transmitter is operable to receive second electronic audio signals from the microphone, and to transmit the second electronic audio signals to the mobile communication device for further transmission from the first mobile communication device to a second communication device located remotely from the electrical power unit and the first mobile communication device.

13 Claims, 5 Drawing Sheets

(51) Int. Cl.

| | | |
|---|---|---|
| *H04W 88/02* | (2009.01) | |
| *H01R 27/02* | (2006.01) | |
| *H04W 4/02* | (2018.01) | |
| *H04M 1/03* | (2006.01) | |
| *H02J 1/00* | (2006.01) | |
| *H02J 3/00* | (2006.01) | |
| *H04M 1/60* | (2006.01) | |
| *H04W 76/40* | (2018.01) | |
| *H04W 84/12* | (2009.01) | |
| *H04W 4/80* | (2018.01) | |

(52) U.S. Cl.
CPC ........... *H04M 1/6033* (2013.01); *H04M 1/62* (2013.01); *H04W 4/023* (2013.01); *H04W 76/40* (2018.02); *H04W 4/80* (2018.02); *H04W 84/12* (2013.01)

(58) Field of Classification Search
CPC .. H04B 1/3877; H04B 1/3827; H04M 1/6033
USPC .. 455/41.2, 41.3, 550.1, 575.1, 575.8, 569.1
See application file for complete search history.

(56) References Cited

U.S. PATENT DOCUMENTS

| | | | |
|---|---|---|---|
| 9,312,673 | B2 | 4/2016 | Byrne et al. |
| 2005/0240346 | A1 | 10/2005 | Lin |
| 2007/0049197 | A1 | 3/2007 | Klein |
| 2007/0206629 | A1 | 9/2007 | Choi |
| 2009/0097363 | A1 | 4/2009 | Nyberg |
| 2009/0215501 | A1 | 8/2009 | Kim |
| 2010/0022220 | A1 | 1/2010 | Gupta et al. |
| 2011/0072083 | A1 | 3/2011 | Suetsugu |
| 2011/0096138 | A1* | 4/2011 | Grimshaw ............ H04M 3/567 348/14.08 |
| 2013/0176738 | A1 | 7/2013 | Tinaphong et al. |
| 2013/0207778 | A1 | 8/2013 | Neafsey et al. |
| 2013/0231161 | A1 | 9/2013 | Hsu et al. |
| 2014/0053185 | A1 | 2/2014 | Bleacher et al. |
| 2014/0188485 | A1 | 7/2014 | Kim et al. |
| 2014/0359712 | A1 | 12/2014 | Takayama |
| 2015/0110324 | A1* | 4/2015 | Feng ..................... H04R 1/028 381/334 |
| 2015/0332580 | A1 | 11/2015 | Bokhary |
| 2016/0112988 | A1 | 4/2016 | Lee |
| 2016/0174347 | A1 | 6/2016 | Parello et al. |
| 2016/0224064 | A1* | 8/2016 | Fleisig ................. G06F 1/1632 |
| 2016/0300403 | A1 | 10/2016 | Harter et al. |
| 2016/0300404 | A1 | 10/2016 | Harter et al. |
| 2016/0300407 | A1 | 10/2016 | Harter et al. |
| 2016/0309307 | A1 | 10/2016 | Agarwal et al. |
| 2017/0038739 | A1 | 2/2017 | Nakamura et al. |
| 2017/0251356 | A1 | 8/2017 | Andrade et al. |

OTHER PUBLICATIONS

Commonly owned co-pending application as filed, U.S. Appl. No. 15/499,331, filed Apr. 27, 2017.
Commonly owned co-pending application as filed, U.S. Appl. No. 15/643,992, filed Jul. 7, 2017.

* cited by examiner

WORK SURFACE POWER UNIT WITH WIRELESS SPEAKERPHONE

CROSS-REFERENCE TO RELATED APPLICATION

The present application claims the filing benefits of U.S. provisional application Ser. No. 62/330,766, filed May 2, 2016, which is hereby incorporated by reference herein in its entirety.

FIELD OF THE INVENTION

The present invention relates to power and/or data systems with communications capabilities, for use in work areas and the like.

BACKGROUND OF THE INVENTION

Mobile communications devices including cell phones, smart phones, and the like have become increasingly compact, and while their size provides significant convenience for users, certain functions such as speakerphone capability often suffer due to speaker and microphone size, quality, and placement.

SUMMARY OF THE INVENTION

The present invention provides an electrical power unit with wireless audio communications capability, including a wireless communications module that is supported in a housing configured to be mounted at or along a work surface. The wireless communications module includes an audio speaker, a microphone, a wireless audio signal receiver, and a wireless audio signal transmitter. The wireless communications module establishes electronic communications with a compatible portable communications device, such as a smart phone, and is then operable as an amplifier whereby incoming sound signals to the phone are transmitted to the wireless communications module, amplified, and output as audible sound from the speaker. The wireless communications module is also operable to receive audio signals from the microphone and transmit these to the coupled portable communications device, which then transmits them to a remote communications device such as a remotely located phone.

According to one form of the present invention, an electrical power unit with wireless communications capability includes a housing that is mountable to a work surface, plus a wireless communications module coupled to the housing. The wireless communications module includes an audio speaker, a microphone, a wireless audio signal receiver, and a wireless audio signal transmitter. The wireless signal receiver receives first electronic audio signals from a first mobile communication device, such as a cellular or mobile phone, and the audio speaker emits amplified sound in response to the wireless signal receiver receiving the first electronic audio signals. The wireless audio signal transmitter receives second electronic audio signals from the microphone, and transmits the second electronic audio signals to the mobile communication device for further transmission from the first mobile communication device to a second communication device, such as another cellular or mobile or hardwired phone, that is located remotely from the electrical power unit and the first mobile communication device.

In one aspect, the wireless communications module is operable to automatically or semi-automatically establish two-way wireless communications with the first mobile communication device when the first mobile communication device is moved to within a predetermined distance of the electrical power unit.

In another aspect, the electrical power unit is operable as a wireless remote speakerphone when the wireless communications module establishes two-way wireless communications with the first mobile communication device.

In a further aspect, there is at least one electrical power receptacle mounted at the housing. Optionally, the at least one electrical receptacle is either a high voltage AC power outlet or a low voltage DC power outlet. Optionally, the electrical receptacle is a low voltage DC power outlet at the wireless communications module. In addition to the low voltage DC receptacle at the wireless communications module, the electrical power unity may further include a high voltage AC power outlet. Optionally, the high voltage AC power outlet and the wireless communications module are slidably coupled to the housing.

In yet another aspect, the wireless communications module further includes a two-piece housing forming an enclosure, a main circuit board, and a support plate. The main circuit board is in electrical communication with each of the audio speaker, the microphone, the wireless audio signal receiver, and the wireless audio signal transmitter. The support plate is disposed between the main circuit board on one side, and with the speaker and the microphone positioned on an opposite side.

In still another aspect, the wireless communications module further includes an elevated circuit board spaced above the main circuit board and the support plate. A pairing button is coupled to the elevated circuit board and is configured to establish wireless two-way communications between the wireless communications module and the first mobile communication device. A low voltage DC power outlet coupled to the elevated circuit board and configured to provide electrical power to a portable electronic device, such as the first mobile communication device, that is positioned outside of the electrical power unit.

In a still further aspect, a frame is positioned atop the support plate and disposed around at least a portion of the elevated circuit board. Optionally, the frame is coupled to the support plate and positioned between the speaker and the microphone.

Thus, the electrical power unit with wireless communications capability cooperates with a mobile communications device to facilitate telephone conferencing by functioning together as a speaker phone, in which the wireless communications module provides sound output and receives sound input, rather than using the microphone and speaker provided on the mobile communications device with which it is wirelessly coupled. The wireless communications module may also be used for playing music or other sounds that it receives wirelessly from the mobile communications device. Substantially any wireless communications protocol may be used for pairing the electrical power unit with wireless communications capability to a smart phone or other portable communications device, including Bluetooth®, near field communications (NFC), and Wi-Fi communications.

These and other objects, advantages, purposes and features of the present invention will become apparent upon review of the following specification in conjunction with the drawings.

DESCRIPTION OF THE PREFERRED EMBODIMENTS

Figure 4:
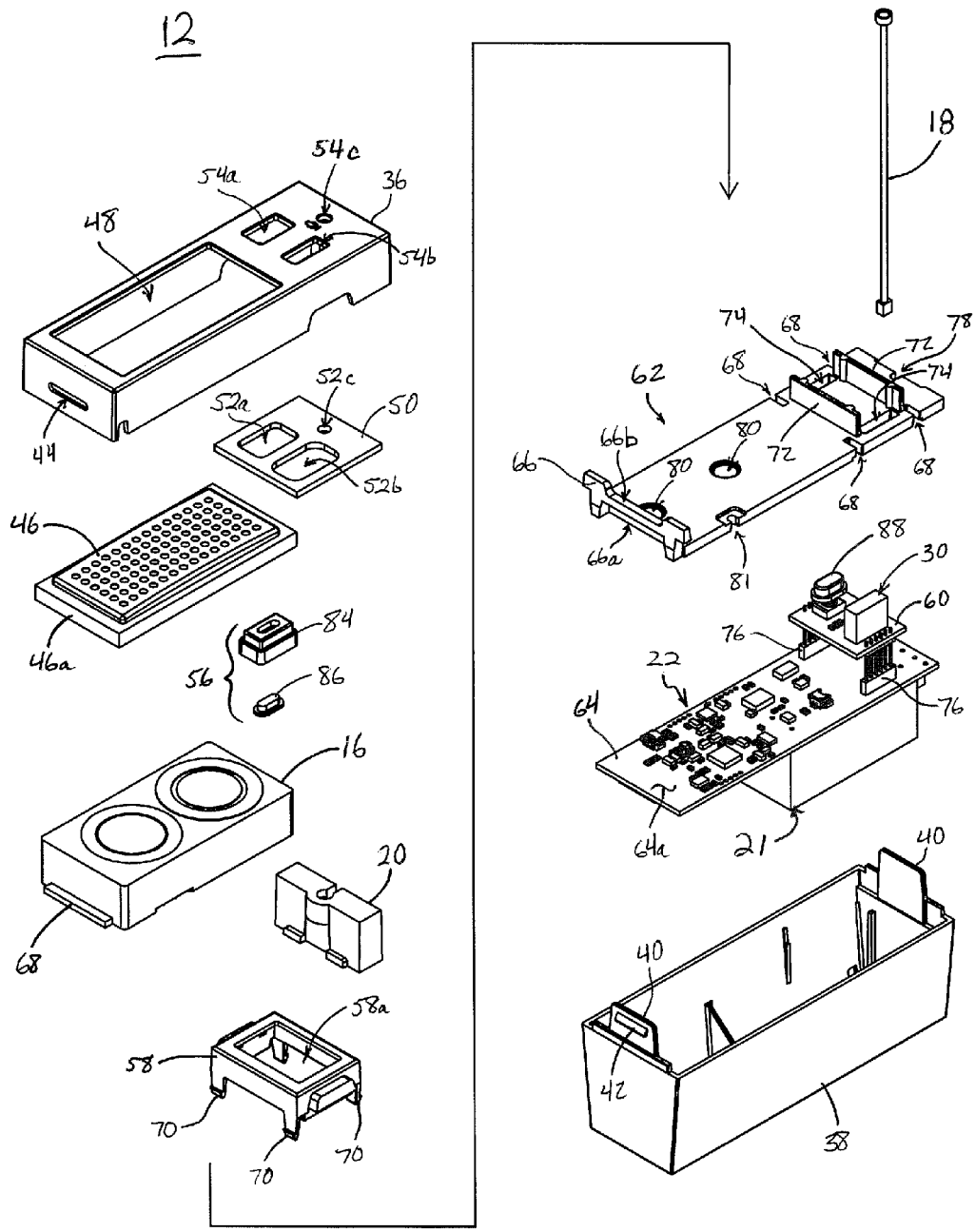
FIG. 4 is an exploded perspective view of the wireless communications module of FIG. 1.

Referring now to the drawings and the illustrative embodiments depicted therein, an electrical power unit with wireless communications capability 10 includes a wireless communications module 12 that is supported in a housing 14 configured to be mounted at or along a work surface. The wireless communications module 12 includes an audio speaker 16, a microphone 18 mounted in an isolation block 20, AC to DC electrical power converter 21, and wireless audio signal transmitter/receiver circuitry 22, such as shown in FIG. 4. Throughout the specification and claims, terms such as "above", "below", "upper", "lower", and "side" are used to express relative positions of various components with reference to the drawings, in which electrical power unit 10 is primarily shown in an orientation with its speaker 16 and microphone 18 in an upwardly-facing orientation. However, it should be understood that such terms are used to facilitate understanding of the construction of electrical power unit 10 with reference to the accompanying drawings, and in particular the construction of the wireless communications module 12, and are not intended to be limiting. As such, it will be appreciated that electrical power unit 10 and wireless communications module 12 may be installed and used in substantially any desirable orientation, including side-facing orientations and even downwardly-facing orientations, without departing from the spirit and scope of the present invention. Moreover, it will be appreciated that electrical power unit 10 and wireless communications module 12 may be installed in various work surfaces, which may include substantially any surface that defines a work area, ranging from tabletops and desktops, to walls or partitions, cabinets (including the undersides of overhanging cabinets), and the like.

Figure 1:
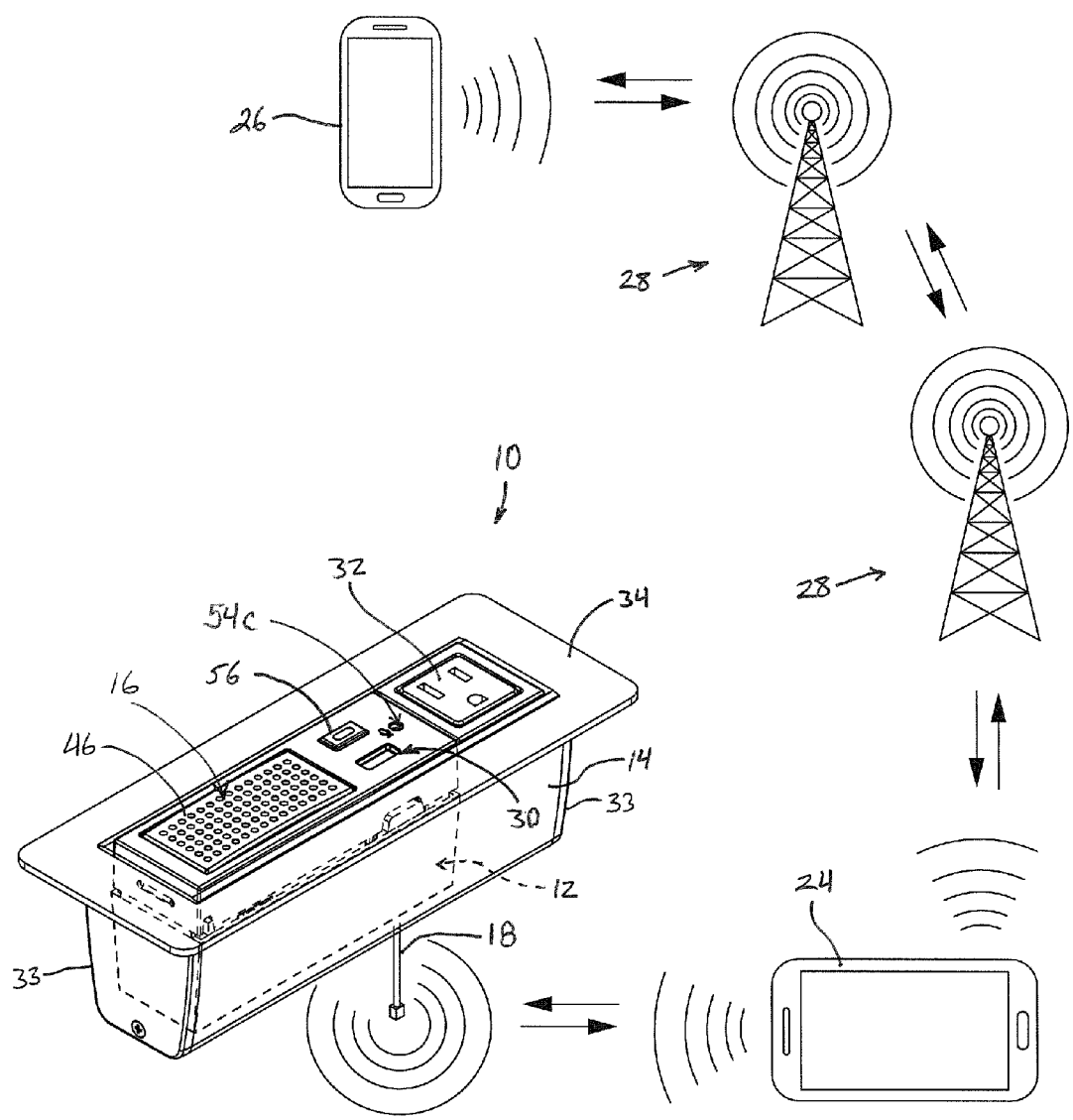
FIG. 1 is a top perspective view of an electrical power unit with wireless communications module in accordance with the present invention, including a diagrammatic view of an exemplary wireless communications path.
Figure 2:
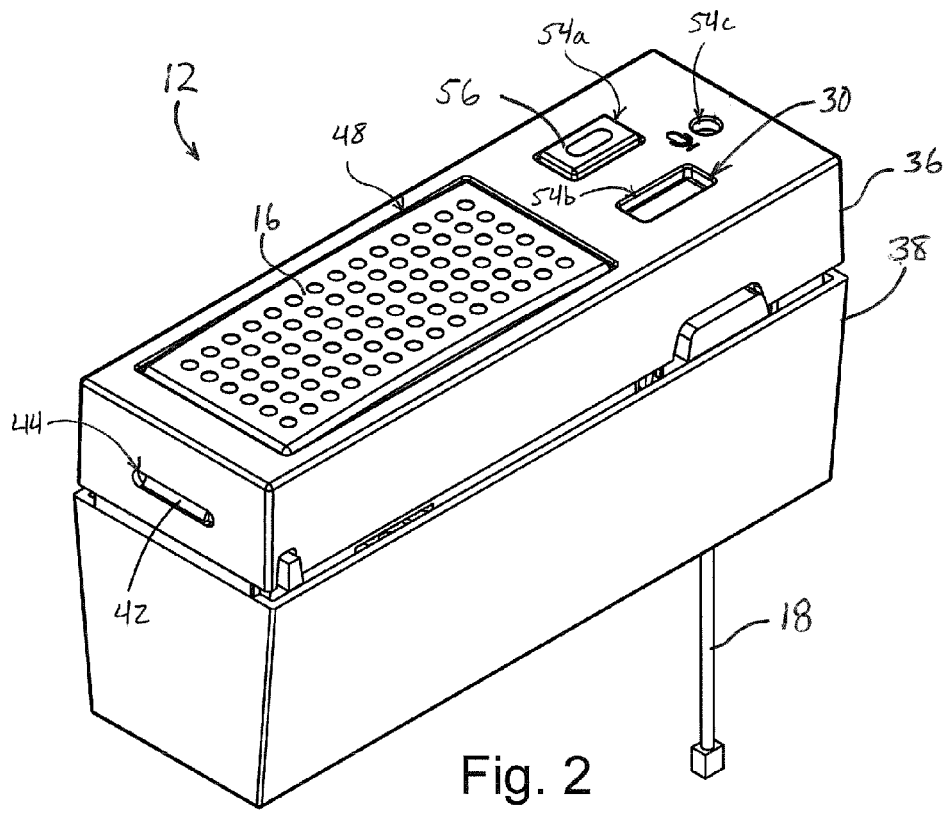
FIG. 2 is a top perspective view of the wireless communications module of FIG. 1.

The wireless communications module 12 establishes electronic communications with a compatible portable communications device, such as a smart phone 24 (FIG. 1), and is then operable as an amplifier whereby incoming sound signals to the phone 24 are transmitted by the phone to the transmitter/receiver circuitry 22 of wireless communications module 12, amplified, and output as audible sound from the speaker 16. The wireless communications module 12 is also operable to detect sound waves at the microphone 18 and transmit these as electronic audio signals to the coupled portable communications device 24 via wireless audio signal transmitter/receiver circuitry 22, which then transmits them to a remote communications device such as a remotely located phone 26, via one or more communications towers 28 or wired communications protocol, such as shown in FIG. 1.

Figure 3:
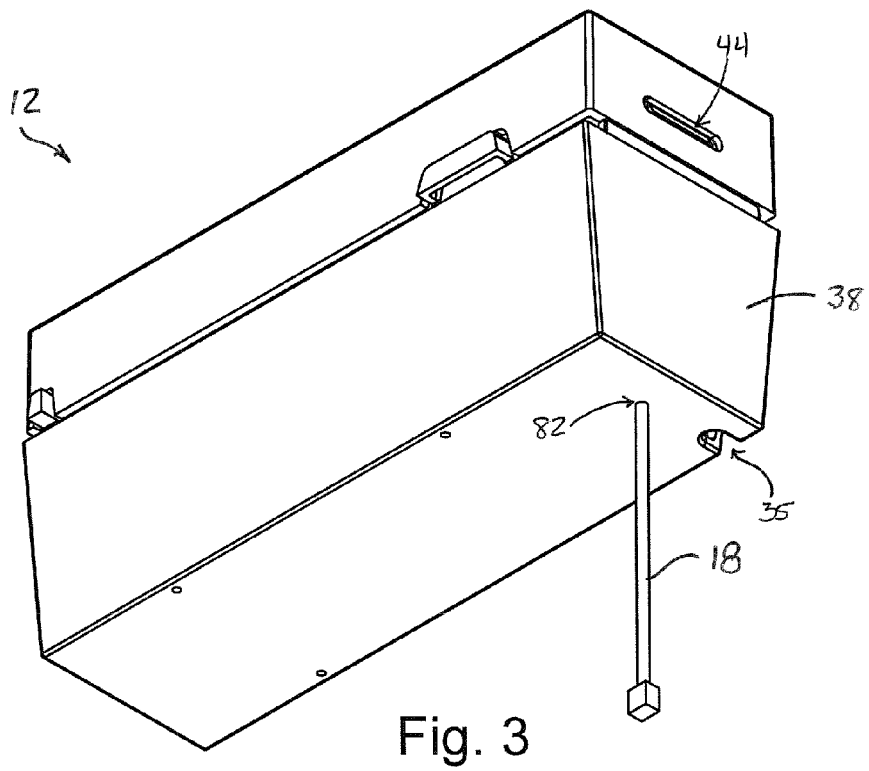
FIG. 3 is a bottom perspective view of the wireless communications module of FIG. 1.
Figure 5:
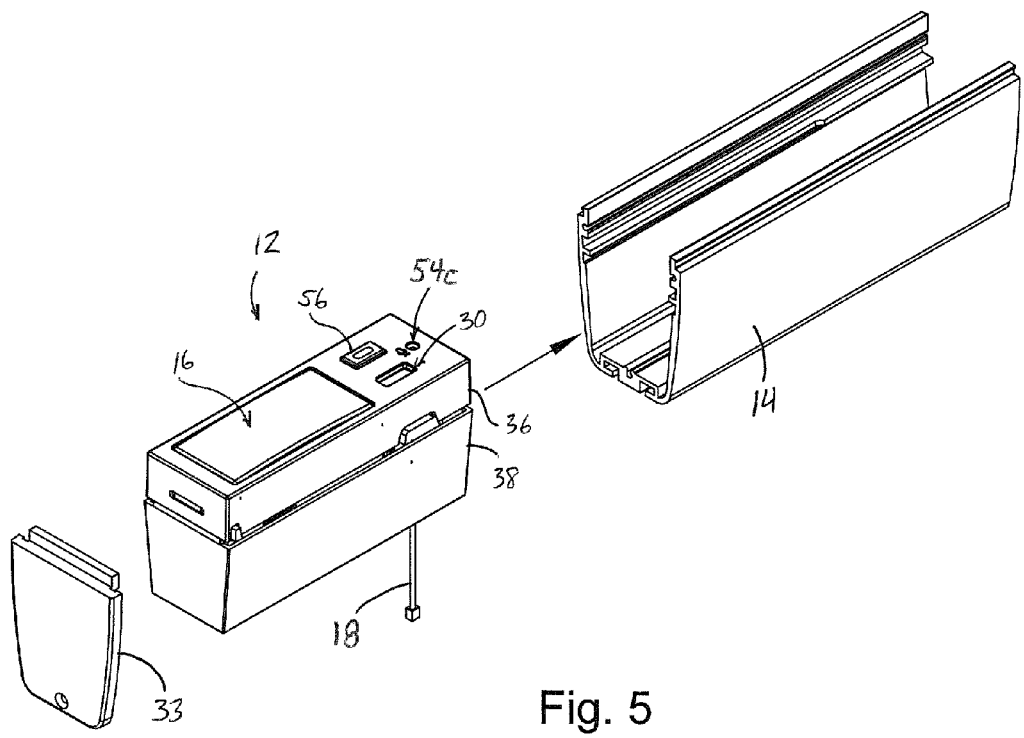
FIG. 5 is an exploded perspective view depicting an assembly step of the electrical power unit with wireless communications module of FIG. 1.
Figure 6:
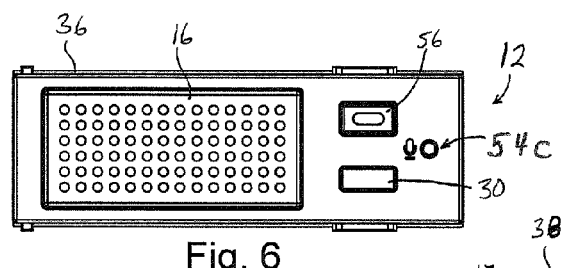
FIG. 6 is a top plan view of the wireless communications module.
Figure 7:
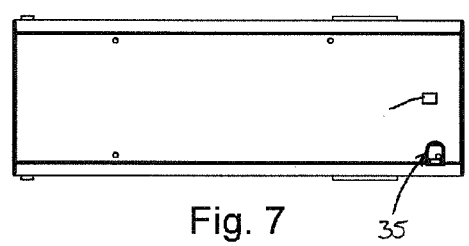
FIG. 7 is a bottom plan view of the wireless communications module.
Figure 8:
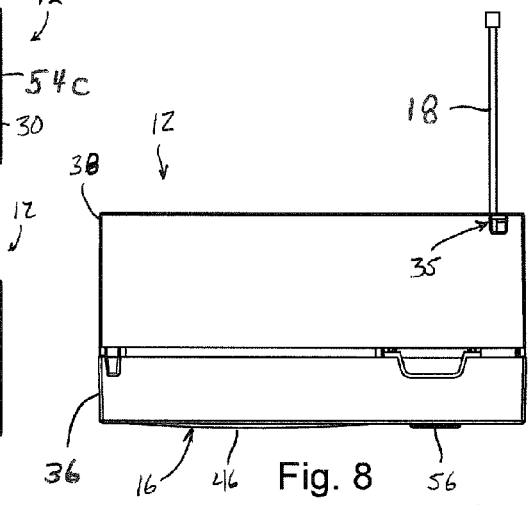
FIGS. 8 and 9 are side elevations of the wireless communications module.
Figure 9:
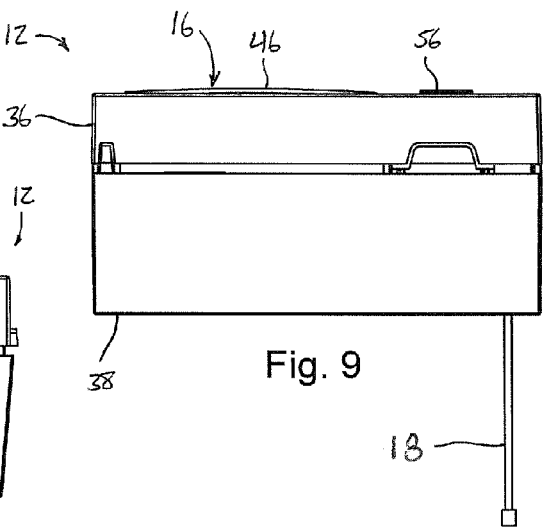
Figure 10:
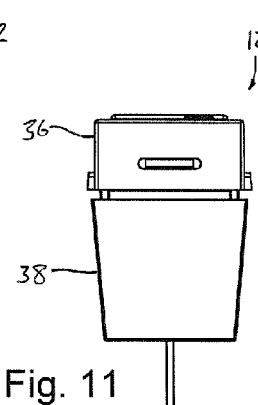
FIGS. 10 and 11 are end elevations of the wireless communications module.
Figure 11:
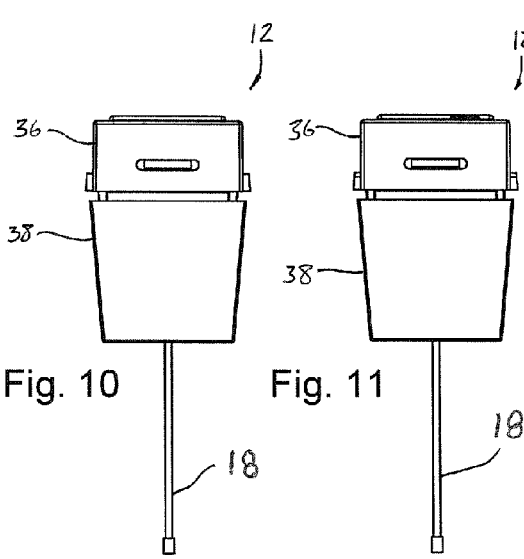

Electrical power unit 10 may include one or more electrical receptacles, such as a low voltage DC receptacle 30 incorporated into wireless communications module 12, and a high voltage AC receptacle 32 supported separately at housing 14 such as in the manner shown in FIG. 5. Optionally, a face plate or bezel 34 is coupled to housing 14 to present a more finished appearance and/or to facilitate mounting the electrical power unit 10 in an opening formed in a work surface such as a table or desk. The open ends of housing 14 may be enclosed by end caps 33. Housing 14 and/or wireless communications module 12 may contain an electrical power converter, such as a DC power converter that receives a high voltage AC output and converts to a low voltage DC output at DC receptacle 30. Optionally, low voltage DC power may be supplied directly to wireless communications module 12 via a wire that passes into module 12 via a passageway 35, such as shown in FIGS. 3, 7 and 8. Housing 14 may be substantially similar to power and data housings described in commonly owned U.S. Pat. Nos. 8,480,429 and 9,312,673, which are hereby incorporated herein by reference in their entireties. Wireless communications module 12, high voltage AC receptacle 32, and substantially any other compatible module, receptacle, or device may be inserted into and secured to housing 14 in substantially the same manner that is described in the above-referenced U.S. Pat. Nos. 8,480,429 and 9,312,673.

Referring now to FIG. 4, wireless communications module 12 includes an upper housing piece 36 that couples to a lower housing piece 38 to form an enclosure for the various electronic components. Upper housing piece 36 and lower housing piece 38 may be substantially similar to front and rear housing portions of an enclosed receptacle housing that is described in commonly owned U.S. Pat. No. 9,312,673, in particular with reference to FIGS. 17-19 thereof. In the illustrated embodiment, lower housing piece 38 includes a pair of upwardly-extending tabs 40, each with an outboard ridge 42 that engages a respective slot 44 formed at each end of upper housing piece 36 to secure the housing pieces together upon assembly.

A speaker grille 46 is positioned above audio speaker 16 and fits into an opening 48 formed in an upper surface of upper housing piece 36. A cover plate 50 is positioned adjacent speaker grille 46 and defines openings 52a-c that correspond to openings 54a-c formed in upper housing piece 36. Openings 52a-c, 54a-c provide access to a pairing button 56, low voltage DC receptacle 30, and microphone 18, respectively. Cover plate 50 may be made from a rigid or semi-rigid material, such as resinous plastic, rubber or rubber-like material, or the like, and may provide a sealing function to limit or prevent entry of contaminants into the interior of wireless communications module 12. Speaker grille 46 includes a perimeter flange 46a that also limits or prevents contaminants from entering the interior of wireless communications module 12 through opening 48 and, optionally, a liquid-resistant membrane or sheet may be placed beneath speaker grille 46 to further resist contaminants entering through openings in the grille 46.

Isolation block 20 and an upper portion of microphone 18 mount near speaker 16, and a frame 58 is mounted between the speaker 16 and isolation block 20. Frame 58 defines an opening 58a in which an upper or elevated circuit board 60, having pairing switch 56 and low voltage DC outlet 30 mounted thereto, is mounted and supported. A generally planar support plate 62 is positioned beneath speaker 16, isolation block 20, an upper portion of microphone 18, frame 58, and upper circuit board 60, and is positioned above a main circuit board 64 to which AC to DC electrical power converter 21, transmitter/receiver circuitry 22, and upper circuit board 60 are mounted. Support plate 62 includes an upright end wall 66 having a lower wall surface 66a that rests along an upper end surface 64a of main circuit board 64, and an upper wall surface 66b including a recessed middle region that receives an outwardly-extending wall 68 at an outboard end of speaker 16. Support plate 62 further includes a set of four slots 68 that receive respective downwardly-extending snap-in legs 70 of frame 58, and a pair of upstanding sidewalls 72 that support frame 58.

Cover plate 50 is placed over both frame 58, microphone 18 and isolation block 20, with openings 52a, 52b providing access to pairing button 56 and low voltage DC receptacle 30, respectively, and with opening 52c providing a sound-conducting passageway for externally-produced sound waves to reach microphone 18. A pair of slots 74 extend between sidewalls 72 and provide space through which lower connectors 76, which are associated with upper circuit board 60, pass for connection to main circuit board 60. A small slot or notch 78 is formed along an end of support plate 62, opposite end wall 66, and provides space for wiring associated with microphone 18 to pass through to main circuit board 64. A pair of recesses 80 are formed in an upper surface of support plate 62 and provide clearance for solder connections to wiring associated with speaker 16, which wiring then passes through another notch 81 formed along an edge of support plate 62 to main circuit board 64. In the illustrated embodiment, speaker 16 is an assembly including two separate audio speakers (FIG. 4), such as for stereo sound capability.

An upper end portion of microphone 18 is received in vibration isolator block 20, which maintains alignment of microphone 18 with the microphone openings 52c, 54c in cover plate 50 and upper housing piece 36, while also improving audio quality and reducing feedback that may otherwise be caused by vibrations of housing portions 36, 38. Microphone 18 is in electrical communication with main circuit board 64, with a lower end portion of microphone 18 exiting through a hole 82 formed in the bottom of lower housing piece 38, such as shown in FIG. 3. In the illustrated embodiment, and as shown in FIG. 4, pairing button 56 includes a top button housing 84 fitted with a translucent insert 86, which are placed atop a selectively-illuminated lower button support 88, which in turn is mounted to upper circuit board 60. This arrangement allows pairing button 56 to provide a user with a visual indication of wireless pairing status between the user's portable electronic communications device 24 and wireless communications module 12. Optionally, audio signals produced through speaker 16 may also provide audible indications of wireless pairing status.

Wireless pairing of wireless communications module 12 with mobile communications device 24 may be conducted by a user in a conventional manner, such as a touch-to-pair method that is typical for pairing compatible devices with NFC capability for Bluetooth® pairing, the use of pairing button 56 to make wireless communications module 12 discoverable by compatible mobile communications devices 24 using Bluetooth® or Wi-Fi or other short or medium range wireless communications protocol, for manual pairing. Optionally, the wireless communications module 12 may be capable of automatically (e.g., using NFC tap-to-pair technology) or semi-automatically (e.g., using pairing button 56) establishing two-way wireless communications with compatible mobile communications devices 24 when one of the mobile communications devices 24 is moved to within a predetermined distance of the wireless communications module 12.

Thus, electrical power unit with wireless communications capability 10 cooperates with the mobile communications device 24 to facilitate telephone conferencing by functioning together as a speaker phone, in which the wireless communications module 12 provides sound output and receives sound input, bypassing the microphone and speaker provided on the mobile communications device 24 with which wireless communications module 12 is wirelessly coupled. The wireless communications module 12 may also be used for playing music or other sounds that it receives wirelessly from the mobile communications device 24. Substantially any wireless communications protocol may be used, including Bluetooth®, near field communications (NFC), and Wi-Fi communications.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An electrical power unit with wireless communications capability, said electrical power unit comprising:
   a two-piece housing forming an enclosure and configured to be mounted at a work surface;
   a wireless communications module coupled to said housing and including an audio speaker, a microphone, a wireless audio signal receiver, and a wireless audio signal transmitter;
   a main circuit board in electrical communication with each of said audio speaker, said microphone, said wireless audio signal receiver, and said wireless audio signal transmitter; and
   a support plate disposed between said main circuit board on one side and each of said speaker and said microphone on an opposite side;
   wherein said wireless communications module further comprises:
      an elevated circuit board spaced above said main circuit board and said support plate;
      a pairing button coupled to said elevated circuit board and configured to establish wireless two-way communications between said wireless communications module and said first mobile communication device; and
      a low voltage DC power outlet coupled to said elevated circuit board and configured to provide electrical power to a portable electronic device positioned outside of said electrical power unit;
   wherein said wireless signal receiver is operable to receive first electronic audio signals from a first mobile communication device, and said audio speaker is operable to emit amplified sound in response to the wireless signal receiver receiving the first electronic audio signals; and
   wherein said wireless audio signal transmitter is operable to receive second electronic audio signals from said microphone, and to transmit the second electronic audio signals to the mobile communication device for further transmission from the first mobile communication device to a second communication device located remotely from said electrical power unit and the first mobile communication device.

2. The electrical power unit of claim 1, wherein said wireless communications module is operable to automatically or semi-automatically establish two-way wireless communications with the first mobile communication device when the first mobile communication device is moved to within a predetermined distance of said electrical power unit.

3. The electrical power unit of claim 2, wherein said electrical power unit is operable as a wireless remote speakerphone when said wireless communications module establishes two-way wireless communications with the first mobile communication device.

4. The electrical power unit of claim 1, further comprising at least one electrical power receptacle mounted at said housing.

5. The electrical power unit of claim 4, wherein said at least one electrical receptacle comprises a high voltage AC power outlet or a low voltage DC power outlet.

6. The electrical power unit of claim 4, wherein said at least one electrical receptacle comprises a low voltage DC power outlet at said wireless communications module.

7. The electrical power unit of claim 6, wherein said at least one electrical receptacle further comprises a high voltage AC power outlet, and wherein said high voltage AC power outlet and said wireless communications module are slidably coupled to said housing.

8. The electrical power unit of claim 1, further comprising a frame configured to be positioned atop said support plate and disposed around at least a portion of said elevated circuit board.

9. The electrical power unit of claim 8, wherein said frame is coupled to said support plate and positioned between said speaker and said microphone.

10. An electrical power unit with wireless communications capability, said electrical power unit comprising:
  a wireless communications module including a main circuit board to which are operatively coupled an audio speaker, a microphone, a wireless audio signal receiver, a wireless audio signal transmitter, and a low voltage DC power outlet; and a support plate disposed between said main circuit board and each of said speaker and said microphone;

wherein said wireless communications module further comprises an elevated circuit board spaced above said main circuit board and said support plate, and a pairing button coupled to said elevated circuit board and configured to establish wireless two-way communications between said wireless communications module and said first mobile communication device;

wherein said wireless signal receiver is operable to receive first electronic audio signals from a first mobile communication device, and said audio speaker is operable to emit amplified sound in response to the wireless signal receiver receiving the first electronic audio signals; and wherein said wireless audio signal transmitter is operable to receive second electronic audio signals from said microphone, and to transmit the second electronic audio signals to the mobile communication device for further transmission from the first mobile communication device to a second communication device located remotely from said electrical power unit and the first mobile communication device.

11. The electrical power unit of claim 10, wherein said low voltage DC power outlet is coupled to said elevated circuit board.

12. The electrical power unit of claim 11, wherein said wireless communications module comprises an upper housing piece and a lower housing piece that cooperate to form an enclosure, said upper housing piece comprising a first opening associated with said speaker, a second opening in which said pairing button is positioned, a third opening in which said low voltage DC power outlet is position, and a fourth opening associated with said microphone.

13. The electrical power unit of claim 10, further comprising an outer housing configured to be mounted at a work surface, wherein said wireless communications module is mounted in said outer housing.

* * * * *